United States Patent [19]
Wilson

[11] 3,816,834
[45] June 11, 1974

[54] ELECTRONIC DIRECTION FINDER
[75] Inventor: Robert C. Wilson, Boulder, Colo.
[73] Assignee: Martin Marietta Corporation, New York, N.Y.
[22] Filed: Oct. 27, 1972
[21] Appl. No.: 301,656

[52] U.S. Cl. .......................... 343/113 R, 324/83 FE
[51] Int. Cl. ............................................... G01s 3/48
[58] Field of Search .............. 343/113 R; 324/83 FE

[56] References Cited
UNITED STATES PATENTS
3,680,124 7/1972 Stone et al. ...................... 343/113 R Primary Examiner—Malcolm F. Hubler
Assistant Examiner—Richard E. Berger
Attorney, Agent, or Firm—Edwards, Spangler, Wymore & Klaas

[57] ABSTRACT

A radio interferometer system for providing indication of the direction of a signal source by detection of the phase difference between signals from the common source which are received by two spaced apart antennas connected respectively to a reference channel and a measurement channel and having means for collapsing a broad spectrum signal for phase measurement at a low frequency by comparison to a locally generated reference signal.

6 Claims, 2 Drawing Figures

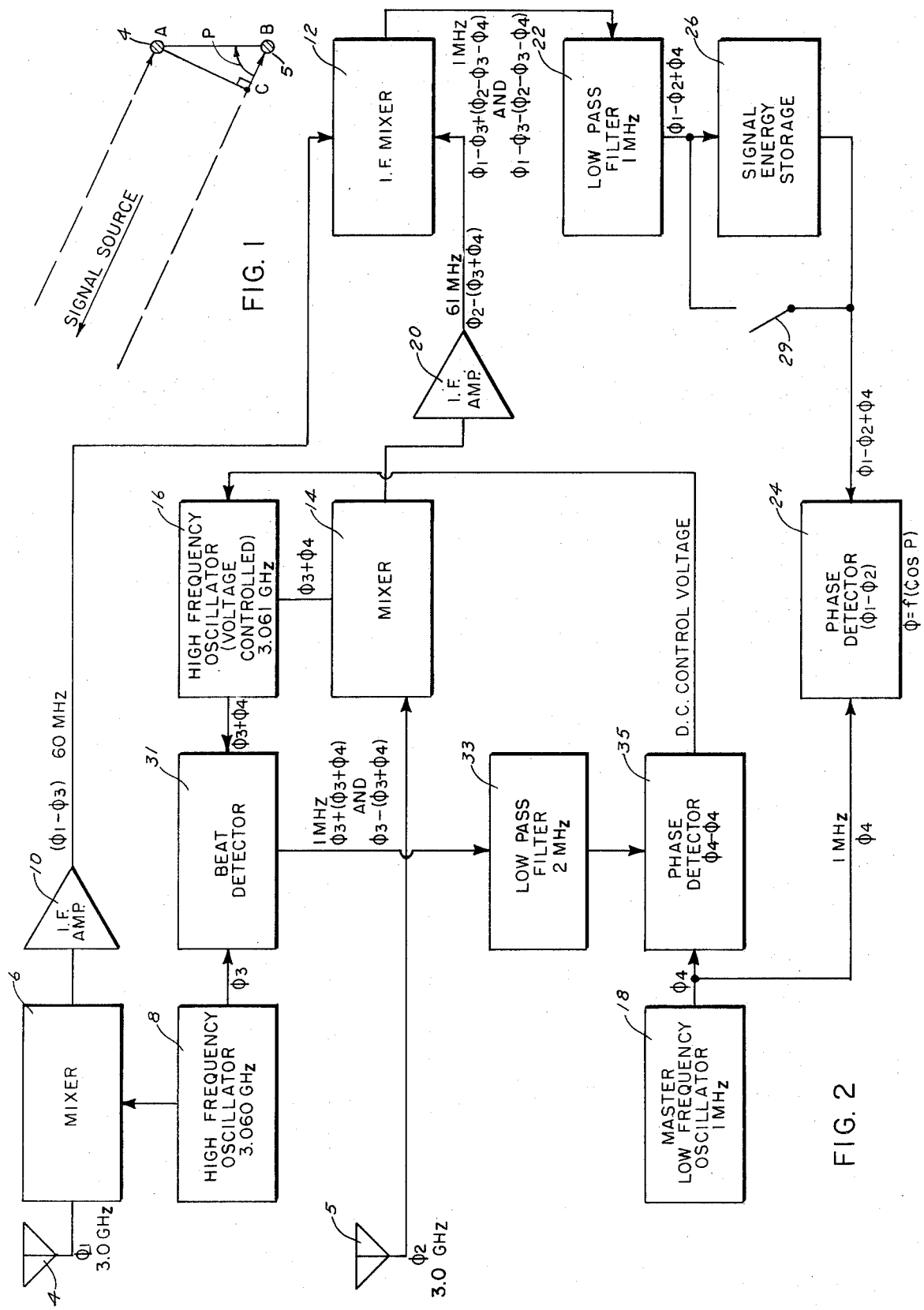

ELECTRONIC DIRECTION FINDER

The primary object of the invention is to provide an electronic direction finder which will indicate bearing direction to a source of either simple or complex signal radiation of either continuous or discontinuous nature.

A further object of the invention is to provide a radio interferometer system solely responsive to electronic processing of received signals and without reliance upon antenna orientation.

Still another object of the invention is to provide a direction finding device which is responsive to a wide range of frequencies, such as pseudo random noise, pulse and continuous wave radiation, and which will convert such frequencies to a common low frequency where phase measurements may be made more easily and accurately.

Another advantage and objective of the apparatus of the present invention is to provide means for increasing the efficiency of radio interferometer devices by optimum utilization of the power contained in spread spectrum signals which are reduced to a common frequency and phase relationship by the use of the signal collapsing technique.

Other features and advantages of the invention will be apparent upon a reading of the following detailed description of a preferred form of the invention taken in connection with the accompanying drawings in which:

FIG. 1 is a diagramatic cross-sectional representation of two spaced apart antennas showing the geometry of the solution provided by the circuitry of the present invention.

FIG. 2 is a block diagram of a preferred form of circuit of the present invention showing phasor relationships and exemplifying the functioning of the circuit by indicating its operation with one particular signal frequency and with particular intermediate frequencies. The frequencies shown in this Figure are representative only and are not intended as limitations.

The direction finder of the present invention is basically of the interferometer type as opposed to the antenna orientation or doppler types. Two antennas 4 and 5 are positioned in spaced apart relationship at points A and B. If a source of electromagnetic radiation is infinitely distant from the antennas, then both antennas can be said to be receiving signal waves which are essentially parallel. Solution of the direction finding problem involves the finding of angle P, the angle from the antenna array to the source of signal radiation. Angle P, being a function of the cosine of the angle, is found by determining the cosine which is BC/AB. The distance AB is the known dimension between antennas 4 and 5. The distance BC is found electronically with the apparatus of the present invention by measuring the phase difference between the signals received by the "reference" antenna 4 and the "measurement" antenna 5.

Referring now to FIG. 2 for a more detailed explanation of a preferred form of the invention, it will be noted that the frequencies noted at various points of the block diagram are for illustrative purposes only and are not intended to specify the apparatus as being applicable only to those frequencies. The block diagram also carries phasor notations ($\phi$) which are arbitrary devices employed for further description of the means and methods to accomplish the objectives of the invention. Phasor representations of a signal are constant amplitude vectors having subscripts which indicate either an angular displacement of the phasor or an angular velocity difference. For purposes of this description, the common source signals received by antennas 4 and 5 will be considered to have constant and equal rotational velocity.

Signals $\phi_1$ and $\phi_2$ from a common source are received by antennas 4 and 5 respectively. The signals are offset in their respective angular positions as a function of the antenna spacing (distance AB in FIG. 1), and the physical location of the radiation source with respect to the antennas.

The "reference" signal $\phi_1$ is passed from the antenna 4 to a signal mixer 6 to be there converted to sum and difference frequencies ($\phi_1 + \phi_3$) and ($\phi_1 - \phi_3$) by beating with the output $\phi_3$ of a local high frequency oscillator 8. Since it is desireable to work with lower frequencies, a tuned intermediate frequency amplifier 10 having a restrictive band pass capability "selects" and amplifies the signal ($\phi_1 - \phi_3$) after which the signal is directed to an intermediate frequency mixer 12. The beat signal for the mixer 12 is derived from a processing of the input signal $\phi_2$ received by the measurement antenna 5.

The measurement antenna signal $\phi_2$ is passed from the antenna 5 to a mixer 14 where the $\phi_2$ signal is beat with the output of a voltage controlled slave high frequency oscillator 16. The slave oscillator 16 produces a signal ($\phi_3 + \phi_4$) having a frquency which is different from that produced by the high frequency oscillator 8 by an amount equal to the frequency of the signal ($\phi_4$) generated by a master (low frequency) oscillator 18. The signal ($\phi_3 + \phi_4$) is made coherent with the signal $\phi_4$, as will subsequently be explained.

The products obtained from the mixer 14 are $\phi_2 + (\phi_3 + \phi_4)$ and $\phi_2 - (\phi_3 + \phi_4)$ which are applied to a second tuned intermediate frequency amplifier 20 having characteristics similar to the I.F. amplifier 10 in the $\phi_1$ channel. The selective band pass of the second I.F. amplifier 20 passes only the lower frequency component of the sum and difference frequencies, $\phi_2 - (\phi_3 + \phi_4)$.

Having an input of ($\phi_1 - \phi_3$) from the I.F. amplifier 10 and a second input of $\phi_2 - (\phi_3 + \phi_4)$ from the second I.F. amplifier 20, the I.F. mixer 12 produces sum and difference output components of $\phi_1 - \phi_3 + (\phi_2 - \phi_3 - \phi_4)$ and $\phi_1 - \phi_3 - (\phi_2 - \phi_3 - \phi_4)$.

An additional low pass filter 22 is utilized to once again select the low frequency component of the mixer 12 output. The output of the filter 22 is $\phi_1 - \phi_3 - (\phi_2 - \phi_3 - \phi_4)$ which equals $\phi_1 - \phi_2 + \phi_4$.

The "collapsed signal" represented by ($\phi_1 - \phi_2 + \phi_4$) is compared with a signal $\phi_4$ generated by the master low frequency oscillator 18. The comparison is made in a substractive phase comparator 24. Selection of the low frequency component of the mixture of the two signals gives $\phi_1 - \phi_2 + \phi_4 - \phi_4 = \phi_1 - \phi_2$. The difference between $\phi_1$ and $\phi_2$ is the difference between the phasors arriving at the antennas 4 and 5. Since these phasors have the same rotational velocity, the output of the phase detector 24 will be a constant representing the angular difference between the signals at the acceptance points (antennas 4 and 5). $\phi = f(\cos P)$.

In order that the apparatus will be able to adequately compare signal information of very short duration, the output of the low pass filter 22 may optionally be stored temporarily in a device such as a tank circuit or other storage element 26. Such storage is, in itself, a well known expedient taking advantage of the resonant qualities of such a circuit to store energy for a period of time depending upon the circuit's figure of merit, Q.

When the storage element is not necessary or desireable, the low pass filter 22 output is shunted around the storage element by means of switch 29.

It was mentioned earlier that the output of the slave high frequency local oscillator 16 was coherent, or in phase, with the output $\phi_4$ of the master low frequency oscillator 18. In order to obtain this coherence, a beat detector 31 is provided in which the output $\phi_3$ of the high frequency oscillator 8 is beat against the output of the slave local oscillator 16, producing sum and difference frequencies $\phi_3 + (\phi_3 + \phi_4)$ and $\phi_3 - (\phi_3 + \phi_4)$. The lower of these frequencies is selected by passing the combination through a low pass filter 33. The output of the filter 33 is $\phi_3 - \phi_3 - \phi_4$ or simply $-\phi_4$. A phase detector 35 compares the phases of $\phi_4$ from the low frequency oscillator 18 and $-\phi_4$ from the low pass filter 33 ($\phi_4 - \phi_4$) and produces a d.c. control signal as a function of phase difference. The d.c. control signal is returned to an input of the slave high frequency voltage controlled oscillator 16 to control the frquency and phase of the oscillator 16, thus providing a servo or locking loop to insure proper phasing of the input signal to the mixer 14.

It is seen then that the foregoing described apparatus accomplishes the objects and purposes of the invention by providing low frequency phasors at the phase detector 24 which are direct functions of the phase difference between $\phi_1$ and $\phi_2$. This phase difference is measured and applied against a constant and is read out on appropriate phase difference indicating means as a bearing to the station from which $\phi_1$ and $\phi_2$ were radiated.

I claim:

1. A radio interferometer system for providing an indication of the direction of a signal source comprising:

a pair of spaced apart signal receiving antennas;
   a respective pair of signal channels connected to said antennas, each having:
   means, including a first and second high frequency local oscillator respectively for producing a first sum and a first difference signal at respective prescribed intermediate frequencies, and
   amplifying means responsive to the said difference signal;
   mixer means heterodyning the difference outputs of said two channels for producing a second sum and a second difference signal at a prescribed second intermediate frequency;
   means having an output selective to the said second difference signal;
   means generating a local low frequency signal having a frequency equal to said second intermediate frequency and a phase coherent with that of the said second local oscillator signal; and
   first phase detector means for comparing the phase of the local low frequency signal and the output of the means selective to the said second difference signal.

2. The combination of claim 1 where the low frequency signal generating means comprises:

a low frequency oscillator;
   a second phase detector having a first input connected to said low frequency oscillator and a d.c. voltage output connected to said second high frequency local oscillator where the frequency and phase of the said second oscillator is responsive to said d.c. voltage;
   beat detector means having respective inputs from said first and second high frequency local oscillators, and where said beat detector means produces sum and difference frequencies; and
   filter means interconnecting the beat detector means and a second input of the said second phase detector.

3. The combination of claim 2 and further including:

resonant circuit means interconnecting the means selective to the said second difference signal and the said first phase detector means; and
   shunt means connected parallel to the resonant circuit means for disconnecting the resonant circuit means.

4. In a radio direction finder of the interferometer type having means responsive to the phase difference between signals from a common source which are received by a pair of spaced antennas, means for detecting the phase angle difference, comprising:

a reference channel connected to one of said antennas and having means for producing a first prescribed intermediate frequency;
   a measurement channel connected to the other of said antennas and having means including a first signal generator for producing a second prescribed intermediate frequency;
   third intermediate frequency producing means including an I.F. mixer connected to the means generating said first and second intermediate frequencies;
   second signal generating means having an output for producing a local signal having a frequency equal to the third intermediate frequency and having control means connected to said first signal generator for controlling the frequency and phase of the first signal generator output, and
   phase detector means responsive to the phase difference between the third intermediate frequency signal and the output of the second signal generating means.

5. The radio direction finder of claim 4 where the second signal generating means includes a locking loop having:

first and second low frequency means for generating a signal equal in frequency to the third intermediate frequency;
   a second phase detector having an output responsive to the phase difference between the signals of said first and second low frequency means; and
   means connecting the said second phase detector to the said first signal generator.

6. The radio direction finder of claim 5 and further including signal energy storage means disposed in series between the third intermediate frequency producing means and the phase detector means.

* * * * *